(12) United States Patent
Noda et al.

(10) Patent No.: US 7,397,994 B2
(45) Date of Patent: Jul. 8, 2008

(54) TWO-DIMENSIONAL PHOTONIC CRYSTAL SLAB HAVING THREE-DIMENSIONAL LOCAL STRUCTURE

(75) Inventors: Susumu Noda, Uji (JP); Takashi Asano, Kyoto (JP); Yoshinori Tanaka, Kyoto (JP)

(73) Assignee: Japan Science and Technology Agency, Saitama (JP)

( * ) Notice: Subject to any disclaimer, the term of this patent is extended or adjusted under 35 U.S.C. 154(b) by 274 days.

(21) Appl. No.: 10/537,119

(22) PCT Filed: Dec. 5, 2003

(86) PCT No.: PCT/JP03/15635

§ 371 (c)(1),
(2), (4) Date: Jun. 15, 2005

(87) PCT Pub. No.: WO2004/053548

PCT Pub. Date: Jun. 24, 2004

(65) Prior Publication Data

US 2006/0051042 A1    Mar. 9, 2006

(30) Foreign Application Priority Data

Dec. 6, 2002    (JP)    ............................. 2002-355631

(51) Int. Cl.
    G02B 6/10    (2006.01)
(52) U.S. Cl. ........................ 385/129; 385/130; 385/132; 385/31; 385/39
(58) Field of Classification Search ............... 385/31, 385/39, 129, 130, 132; 359/237, 321
    See application file for complete search history.

(56) References Cited

U.S. PATENT DOCUMENTS 6,198,860 B1 * 3/2001 Johnson et al. ............... 385/28

(Continued)

FOREIGN PATENT DOCUMENTS

EP    1 136 853 A1    9/2001

(Continued)

OTHER PUBLICATIONS

Iwamoto et al., "Functional Photonic Crystal Devices Using Micro-Electromechanical Systems," 2002 Nen Shuki Dai 63 Kai Extended Abstracts; *The Japan Society Of Applied Physics*, 26p-YA-8 MEMS o Riyo Shita Kinosei Photonic Kessho Shoshi, Hakko, Dai 3 Bunsatsu, pp. 922 {Sep. 24, 2002}.

(Continued)

*Primary Examiner*—Frank G Font
*Assistant Examiner*—Michael P Mooney
(74) *Attorney, Agent, or Firm*—Oliff & Berridge, PLC

(57) ABSTRACT

The present invention aims to provide a two-dimensional photonic crystal having an optical resonator, which allows the control of the front/back emission ratio of light. To achieve this object, a refractive index member made of a material having a refractive index different from that of air is mounted on a two-dimensional photonic crystal having a body in which holes are periodically arranged. In this construction, the body and the refractive index member cooperatively function as an optical resonator located at the position where the refractive index member is mounted. The light emitted from this optical resonator is stronger on the side having a higher refractive index, i.e. on the side where the refractive index member is mounted. Accordingly, the light emitted from the side where the refractive index member is mounted is stronger than the light emitted from the other side. The ratio of the emission intensity of the two rays of light and, i.e. the front/back emission ratio, can be controlled by changing the material, shape and/or size of the refractive index member.

15 Claims, 6 Drawing Sheets

U.S. PATENT DOCUMENTS

2003/0234972 A1* 12/2003 Simon .................. 359/321
2004/0213534 A9* 10/2004 Matsuura et al. ............ 385/129

FOREIGN PATENT DOCUMENTS

| JP | A 06-06490 | 3/1994 |
| JP | A 06-82642 | 3/1994 |
| JP | 2001-272555 | 10/2001 |
| JP | A 2003-279764 | 10/2003 |
| JP | A-2004-029810 | 1/2004 |
| WO | WO 02/14913 A1 | 2/2002 |

OTHER PUBLICATIONS

Tanaka et al., "Improvement in Q Factor of Point Defect Cavity in SOI Based 2D Photonic Crystal Slab," 2003 Nen Shuki Dai 64 Kai Extended Abstracts; *The Japan Society of Applied Physics*, 1a-ZM-10, 2-Jigen Photonic Kessho Slab-Ten Kekkan Kyoshinki heno 3-Jigen Kako no Koka-Rironkaiseki, Hakko, Dai 3 Bunsatsu, pp. 942 {Aug. 30, 2003}.

\* cited by examiner (a)  (b)

(a) REFRACTIVE INDEX MEMBER NOT MOUNTED (COMPARATIVE SAMPLE)

(b) REFRACTIVE INDEX MEMBERS MOUNTED ON BOTH SIDES (PRESENT INVENTION)

(a) REFRACTIVE INDEX MEMBER NOT MOUNTED (COMPARATIVE SAMPLE)

y-z plane x-z plane (b) REFRACTIVE INDEX MEMBERS MOUNTED ON BOTH SIDES (PRESENT INVENTION)

y-z plane x-z plane (a)

(b)

(c)

TWO-DIMENSIONAL PHOTONIC CRYSTAL SLAB HAVING THREE-DIMENSIONAL LOCAL STRUCTURE

TECHNICAL FIELD

The present invention relates to a two-dimensional photonic crystal applicable to an optical multiplexing/demultiplexing device, or similar devices, used in wavelength division optical multiplex communication or other technologies. Particularly, it relates to a technique for efficiently sending and receiving light to and from the outside through an optical resonator provided in the device.

BACKGROUND ART

Recently, photonic crystals have been drawing attentions as a new optical device. A photonic crystal is a functional material having a periodic distribution of refractive index, which provides a band structure with respect to the energy of light or electromagnetic waves. One of its particular features is that it has an energy region (called the photonic bandgap) that forbids the propagation of light or electromagnetic waves.

Introduction of an appropriate defect into the distribution of refractive index in the photonic crystal will create an energy level (called the defect level) due to the defect within the photonic bandgap. This allows only a specific wavelength of light having an energy corresponding to the defect level to exist within the wavelength range corresponding to the energy levels included in the photonic bandgap. Forming a linear defect in the crystal provides a waveguide, and forming a point-like defect in the crystal provides a resonator.

Photonic crystals can be classified into two-dimensional and three-dimensional crystals. Each of them has its own features and advantages. For example, two-dimensional crystals are advantageous in that they are relatively easy to manufacture. The Japanese Unexamined Patent Publication No. 2001-272555 discloses a two-dimensional photonic crystal with cylindrical holes periodically arranged in a triangular lattice pattern to provide a periodic distribution of refractive index, in which a linear zone devoid of the cylindrical holes is formed as a waveguide ([0025], FIG. 1) and a point defect is formed in proximity to the waveguide ([0029], FIG. 1). The Japanese Unexamined Patent Publication No. 2001-272555 includes the analysis of an embodiment of a point defect that is formed by increasing the diameter of the periodically arranged cylindrical holes.

In the Japanese Unexamined Patent Publication No. 2003-279764, the applicant of the present invention has proposed the creation of a cluster defect by making defects of two or more pieces of modified refractive index areas adjacent to each other within a plurality of modified refractive index areas forming a periodic distribution of refractive index. The defects of the modified refractive index areas are formed by making the refractive index of the desired part of the modified refractive index areas different from that of the rest of the modified refractive index areas. A defect having a refractive index lower than that of the rest of the modified refractive index areas is called the acceptor type defect, whereas a defect having a higher refractive index is called the donor type defect. The defect disclosed in the Japanese Unexamined Patent Publication No. 2001-272555, which is created by enlarging the cylindrical hole, is an acceptor type defect, whereas a defect created by not providing the modified refractive index area is a donor type defect. The cluster defect and a point defect created by the absence of a single piece of modified refractive index area are generally called the "point-like defect."

The two-dimensional photonic crystal with a point-like defect or point like defects can be used for various purposes, a typical example of which is the optical multiplex communication. Recently, optical multiplex communications use the wavelength division multiplexing in which plural wavelengths of light, each carrying a different signal, propagate through a single transmission line. With a waveguide accompanied by a plurality of point-like defects each having a defect level corresponding to each wavelength, the two-dimensional photonic crystal can be used as a demultiplexer for taking out a specific wavelength of light (i.e. signal) through each point-like defect from the light propagating through the waveguide, or as a multiplexer for introducing a specific wavelength of light through each point-like defect into the waveguide.

In the case of taking out a ray of light from a point-like defect (i.e. optical resonator) of a demultiplexer or a similar device, if the defect has a cylindrical shape or a similar shape symmetrical in the direction orthogonal to the surface of the two-dimensional photonic crystal, the light is emitted from both sides with the same intensity. However, if the two-dimensional photonic crystal is mounted on a substrate, the light emitted from the side facing the substrate is lost, and only the light emitted from the free side of the crystal is available. Taking this into account, in the Japanese Unexamined Patent Publication Nos. 2001-272555 and 2003-279764, research is conducted on methods for controlling the ratio of the emission intensity of the light from one side to that of the light from the other side (this ratio is called the "front/back emission ratio" hereinafter) by making the point-defect asymmetrical between the two sides. This increases the emission intensity from one side and accordingly improves the emission efficiency (or take-out efficiency) of light. For example, the Japanese Unexamined Patent Publication No. 2001-272555 discloses a cone-shaped point defect functioning as an acceptor type defect ([0032], FIG. 5) and a point defect having different diameters on both sides ([0032], FIG. 6).

However, it is not easy to create a point-like defect by asymmetrically working the body of the two-dimensional photonic crystal itself on both sides. For example, the Japanese Unexamined Patent Publication No. 2001-272555, in [0039] and [0040], describes a method of creating a point-like defect by masking one face of a crystal with a photoresist, except for the area corresponding to the defect, and etching the face with a reactive ion beam. This method is capable of forming a point-like defect having a cylindrical shape or a similar shape that is symmetrical between the two sides, but not capable of forming a point-like defect having a conic shape or a similar shape that is asymmetrical between the two sides.

In view of the aforementioned problem, the present invention aims to provide a two-dimensional photonic crystal having a point-like defect or point-like defects that enable the control of the front/back emission ratio of light and are easier to manufacture than conventional defects.

DISCLOSURE OF THE INVENTION

To solve the aforementioned problem, the present invention provides a two-dimensional photonic crystal slab having a three-dimensional local structure, which is characterized by:

a) a slab-shaped body;
b) a plurality of areas having a refractive index different from that of the body, which are periodically arranged in the body; and
c) a refractive index member mounted on the surface of the body.

It should be noted that, in the present application, the "refractive index member" is a member made of a material having a refractive index different from that of air.

The two-dimensional photonic crystal slab having a three-dimensional local structure according to the present invention includes, as its base component, a two-dimensional photonic crystal whose body consists of a slab, or a plate member whose thickness is adequately smaller than its in-plane size, on which a plurality of areas having a refractive index different from that of the body are periodically arranged. Within the two-dimensional photonic crystal used as the body component, the periodical arrangement of the modified refractive index areas creates a photonic bandgap, which prevents the existence of light whose energy is within the range of the bandgap. This means that any ray of light whose wavelength is within the photonic bandgap cannot pass through the body. The body may be made of Si, InGaAsP or other materials. A typical example of the modified refractive index area is a cylindrical hole disclosed in the Japanese Unexamined Patent Publication No. 2001-272555. Use of the cylindrical holes enables the body to be fabricated by a simple process of boring holes in the body. This process is easier than arranging some members in the body.

A refractive index member made of a material having a refractive index different from that of air is mounted on the surface of the body in which the modified refractive index areas have been arranged. Here, an appropriate setting of the refractive index (or material), shape, size and position of the refractive index member creates a defect level having a desired value within the photonic bandgap. The point at which the refractive index member is mounted becomes a point defect and functions as an optical resonator that generates a resonance of light at a desired wavelength. It is allowable to mount two or more pieces of refractive index members on the body. Mounting two or more pieces of refractive index members differing in material, shape or size, or in two or more of these attributes, will provide an optical resonator that generates resonances of light at two or more different wavelengths.

If the refractive index member is mounted only on one side of the two-dimensional photonic crystal, the point defect created by the refractive index member becomes asymmetrical with respect to the plane of the two-dimensional photonic crystal; it becomes a point defect asymmetrical between the two sides. The ratio of the emission intensity of the light emitted to one side to that of the light emitted to the other side, i.e. the front/back emission ratio, can be controlled by changing the material, shape and/or size of the refractive index member.

Changing the shape of the refractive index member enables the control of not only the front/back emission ratio of light but also the emitting direction, the degree of convergence/spread and other attributes of light. For example, forming the top of the refractive index member in a concave form will cause the emitted light to converge on a single point within the space. In this case, the position of the convergence point can be controlled by regulating the curvature of the top. A convex form of the top of the refractive index member, on the other hand, enables the radiation angle to be controlled through the regulation of the curvature of the top. Besides the change of the form of the refractive index member, another possible method of controlling the radiating direction of light is to provide a distribution of refractive index within the refractive index member. It should be noted that the idea of controlling the emitting direction and the convergence/spread of light is quite new to conventional types of two-dimensional photonic crystal optical resonators.

The refractive index members may be mounted on both sides of the body. If a refractive index member is mounted on one side and another refractive index member is mounted on the other side at a position displaced from the first refractive index member, they will function as two point-like defects differing in the front/back emission ratio. If two pieces of refractive index members are mounted on both sides of the body at the same position, the refractive index members will cooperatively function as a single point-like defect. In this case, use of two refractive index members differing in material, shape or size enables the emission intensity, direction, convergence, spread and/or other attributes of light on one side to be different from that of the other side. If it is required to control the emission intensity, direction, convergence, spread and other attributes while maintaining them identical on both sides, the requirement can be met by mounting two identical pieces of refractive index members on both sides and at the same position.

The position of a conventional type of point-like defect, either an acceptor type or a donor type, has been restricted to the positions of the modified refractive index areas. In contrast, the point-like defect created by the refractive index member according to the present invention can be located at a desired position on the body. The resonant wavelength of light at the point defect created by the refractive index member changes depending to the positional relation between the refractive index member and the modified refractive index areas in addition to the material type and other parameters of the refractive index member itself.

It is advantageous to provide a point-like defect of the modified refractive index areas within the body and additionally mount a refractive index member at the position of the point-like defect. In this construction, the refractive index member and the point-like defect of the modified refractive index areas cooperatively function as a single point-like defect. If each point-like defect is composed of a different point-like defect of the modified refractive index areas and a different refractive index member, the resonant wavelength can be selected with a higher degree of freedom than in the case where either a refractive index member or a point-like defect of the modified refractive index areas is solely present. If a plurality of point-like defects of the modified refractive index areas having different resonant wavelengths are provided within the body and a plurality of refractive index members identical in material, shape and size are arranged on the surface of the body at the positions of the point-like defects of the modified refractive index areas, respectively, it is possible to take out a ray of light having a different wavelength from each defect position approximately in the same direction and with the same degree of convergence/spread.

It is also allowable to provide the body with both the point-like defect of the modified refractive index areas created by working the body itself asymmetrically with respect to the central plane and the point defect created by using the refractive index member according to the present invention. Regulating the parameters of both the point-like defect of the modified refractive index areas and the refractive index member enables the front/back emission ratio, the emitting direction and other attributes to be controlled more freely than in the case of providing only the refractive index member.

The material of the refractive index member may be different from or the same as that of the body. Using the same material facilitates the bonding of the refractive index member to the body. Selecting from a set of materials different from the body material allows the resonant wavelength to vary over a wide range.

Some materials have the nature of changing their refractive index when they receive an irradiation from a laser, an application of pressure or heat, or other external operations. For example, some of the InGaAsP series, InGaAlAsP series or similar types of semiconductors change their charge density and accordingly change their refractive index when a laser beam is irradiated onto them, as a result of the band-filling effect of the quantum well. Using such a material to fabricate a refractive index member enables the construction of an optical resonator whose resonant wavelength can be controlled by varying the external operation.

If a waveguide is created by providing a linear defect of the modified refractive index areas in proximity to the various types of refractive index members described thus far, the two-dimensional photonic crystal functions as an optical multiplexer/demultiplexer using the refractive index member to demultiplex a predetermined wavelength of light from the light propagating through the waveguide toward the outside, or multiplex a predetermined wavelength of light from the outside into the waveguide.

The two-dimensional photonic crystal slab having a three-dimensional local structure according to the present invention enables the control of the front/back emission ratio, the emitting direction, the convergence/spread and other attributes of light. The efficiency of taking out light from the point defect can be improved by controlling the front/back emission ratio so that the emission intensity of light becomes higher on the side where the light is taken out than on the other side. Controlling the emitting direction and/or the convergence/spread of light improves the efficiency of introducing the light from the point defect into an optical fiber or other elements located outside the crystal.

The point defect created by using the refractive index member according to the present invention is easier to manufacture than conventional types of point-like defects manufactured by asymmetrically working the body of the two-dimensional photonic crystal itself on both sides. The higher degree of freedom for determining the shape and material of the refractive index member makes the control of the front/back emission ratio of light easier than in the conventional cases. Furthermore, the point defect created by using the refractive index member according to the present invention provides an easier control of the emitting direction, the convergence/spread and other attributes of light than the corresponding control available with the aforementioned symmetrical point-like defect of the modified refractive index areas.

BEST MODE FOR CARRYING OUT THE INVENTION

Figure 1:
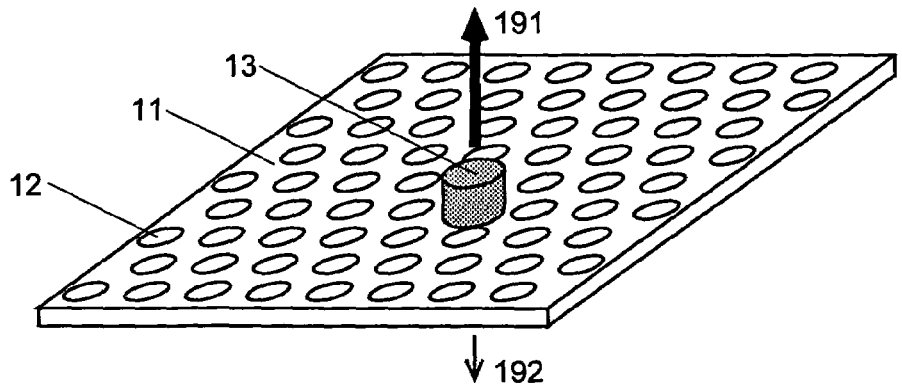
FIG. 1 is a perspective view of an embodiment of the two-dimensional photonic crystal slab having a three-dimensional local structure according to the present invention.

FIG. 1 shows an embodiment of the two-dimensional photonic crystal slab having a three-dimensional local structure according to the present invention. The body 11 is provided with holes 12, or modified refractive index areas, periodically arranged in a triangular lattice pattern. The body 11 and the holes 12 constitute the two-dimensional photonic crystal. A refractive index member 13 is mounted on one of the holes 12. The point at which the refractive index member 13 is mounted functions as an optical resonator. When light is emitted from this optical resonator, the light 191 emitted from the side on which the refractive index member 13 is mounted is stronger than the light 192 emitted from the other side.

The form of the two-dimensional photonic crystal slab according to the present invention is not restricted to the one shown in FIG. 1. For example, the modified refractive index area may be created by embedding a member made of a material having a refractive index different from that of the body 11. The arrangement of the holes 12 may be a square lattice pattern or some other pattern different from the triangular lattice pattern. The refractive index member 13 may be mounted on a point different from the holes 12, e.g. on the center of gravity of a triangle in the triangular lattice pattern.

Figure 2:
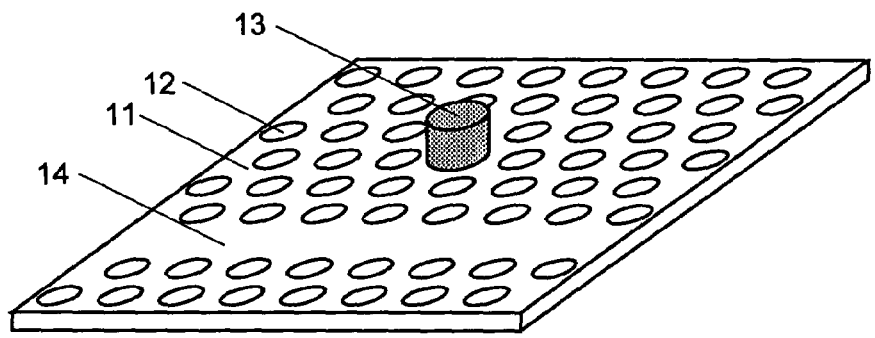
FIG. 2 is a perspective view of an embodiment of the two-dimensional photonic crystal wavelength multiplexer/demultiplexer according to the present invention.

FIG. 2 shows an embodiment of the optical multiplexer/demultiplexer using a two-dimensional photonic crystal slab according to the present invention. A waveguide 14 is formed in proximity to the optical resonator (i.e. the point at which the refractive index member 13 is mounted) by providing a linear defect of the holes 12 (i.e. by forming a linear zone devoid of the holes 12). This provides an optical multiplexer/demultiplexer that demultiplexes a ray of light having the resonant wavelength of the optical resonator from the light propagating through the waveguide 14 and sends it through the refractive index member 13 to the outside, or multiplexes a ray of light through the refractive index member 13 into the waveguide 14.

Figure 3:
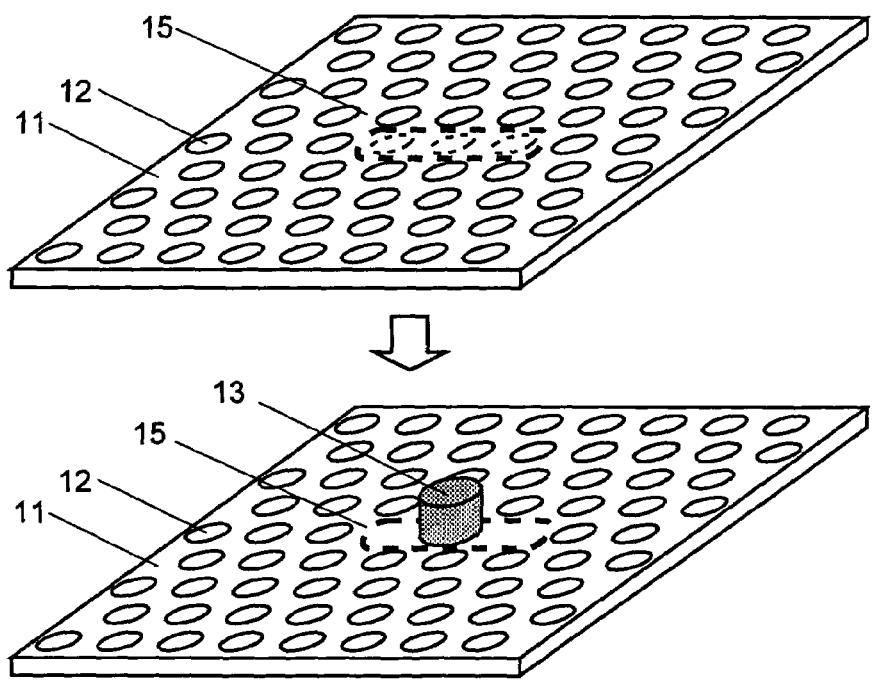
FIG. 3 is a perspective view of an embodiment of the two-dimensional photonic crystal with a refractive index member mounted on a point-like defect of the modified refractive index areas.
Figure 4:
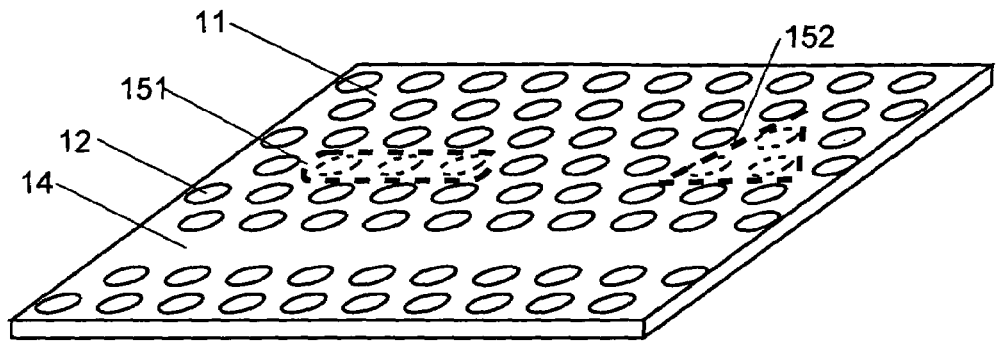
FIG. 4 is a perspective view of an embodiment of a two-dimensional photonic crystal wavelength multiplexer/demultiplexer with refractive index members mounted on point-like defects of the modified refractive index areas.
Figure 4:

FIGS. 3 and 4 show embodiments of two-dimensional photonic crystals and optical multiplexer/demultiplexers with a refractive index member mounted on a point-like defect of the modified refractive index areas. In the two-dimensional photonic crystal, a plurality of holes 12 adjacent to each other are omitted to create a donor type cluster defect 15 (as in the upper part of FIG. 3, where the absent holes are indicated by the broken line), and a refractive index member 13 is mounted on the surface at the position of the donor type cluster defect 15 (as in the lower part of FIG. 3). The refractive index member 13 and the donor type cluster defect 15 cooperatively function as a single point-like defect. The donor type cluster defect may be different from the one shown in FIG. 3, which consists of three point defects arranged in a line. For example, it may consist of three point defects adjacent to each other in a triangular pattern, or two, four or more point defects adjacent to each other. It is also allowable to mount the refractive index member 13 on an acceptor type point-like defect, as in the case of the donor type cluster defect.

The above-described donor type cluster defect 151 having a linear form and another donor type cluster defect 152 having a triangular form are now provided in a single two-dimensional photonic crystal (as in the upper drawing of FIG. 4, where each point defect is indicated by a corresponding broken line), and identical refractive index members 131 and 132 are mounted on the two-dimensional photonic crystal at the positions of the aforementioned defects (as in the lower drawing of FIG. 4) to construct two resonators each of which generates a resonance of light at a different wavelength. This provides an optical multiplexer/demultiplexer that demultiplexes rays of light having the aforementioned wavelengths from the waveguide 14 and sends them through the refractive index member 131 or 132 to the outside, or multiplexes rays of light from the outside through the refractive index member into the waveguide 14.

Figure 5:
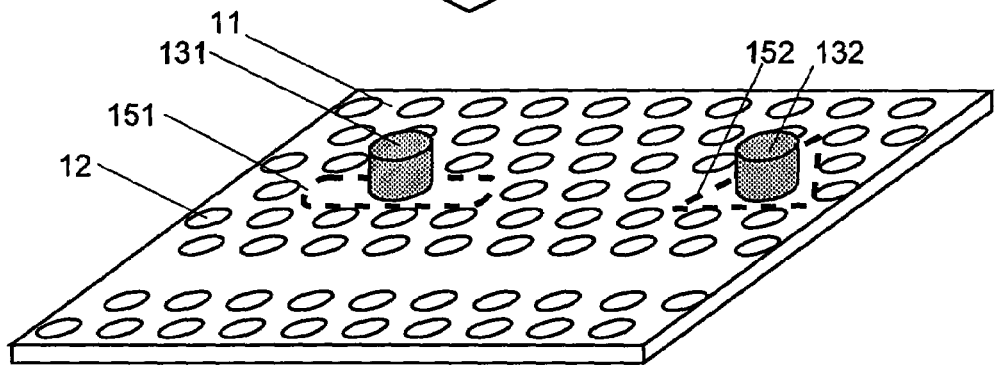
FIG. 5 is a perspective view of an embodiment of a two-dimensional photonic crystal and optical multiplexer/demultiplexer with two or more types of different refractive index members mounted on it.
Figure 5:
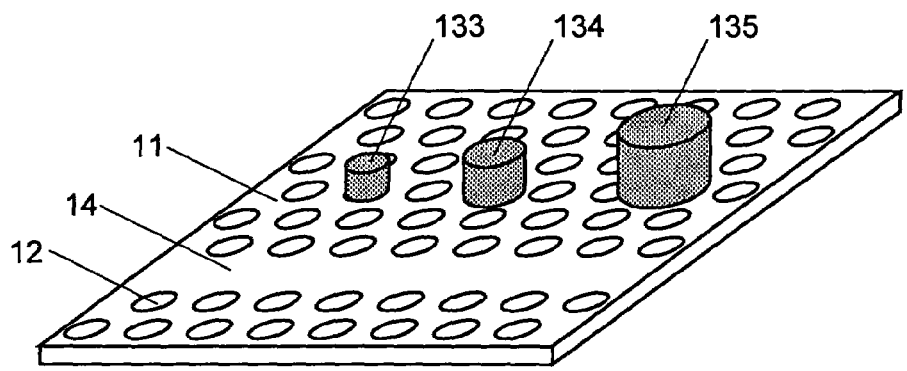

FIG. 5 shows an embodiment of a two-dimensional photonic crystal and an optical multiplexer/demultiplexer with two or more types of refractive index members mounted on it. Three types of refractive index members 133, 134 and 135 having different sizes are located in proximity to the waveguide 14. Each point at which each refractive index member is mounted functions as an optical resonator that generates a resonance of light at a different wavelength, and the light having that wavelength is demultiplexed from the waveguide 14 through the refractive index member to the outside or multiplexed from the outside through the refractive index member into the waveguide 14. In addition to the difference in size of the refractive index members shown in FIG. 5, a difference in material, shape or other attribute of the refractive index member also enables different wavelengths of light to be multiplexed/demultiplexed.

Figure 6:
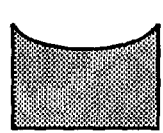
FIGS. 6(a) and 6(b) are sectional views showing examples of the shape of the refractive index member.
Figure 6:
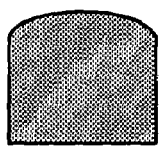

FIGS. 6($a$) and 6($b$) show examples of the shape of the refractive index member as sectional views. In FIG. 6($a$), the refractive index member is a cylindrical body having a concave top, which converges the emitted light onto a single point within the space. In the example of FIG. 6($b$), the top is convex shaped and emits a ray of light whose radiation angle is determined by the curvature of the convex top. The concave or convex section may be formed on the top of a cylinder, a rectangular solid or a similar body.

Figure 7:
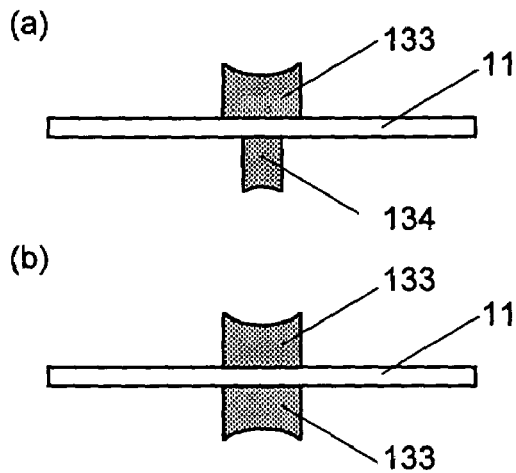
FIGS. 7(a) and 7(b) are sectional views of an embodiment of the two-dimensional photonic crystal with refractive index members mounted on both sides of the crystal body at the same position.

FIGS. 7($a$) and 7($b$) show an embodiment of the two-dimensional photonic crystal with refractive index members mounted on both sides of the crystal body at the same position. In FIG. 7($a$), refractive index members 133 and 134 having different sizes and identical concave surfaces are mounted on both sides of the body 11. This construction generates an emission of light converging onto a single point within the space on each side, with different intensities on both sides. In FIG. 7($b$), identical refractive index members 133 each having a convex surface are provided on both sides of the body 11. This construction generates an emission of light converging onto a single point within the space on each side, with the same intensity on both sides.

Figure 8:
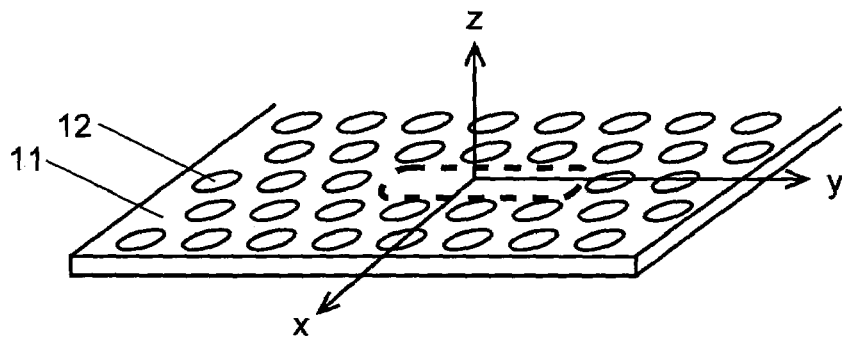
FIG. 8 shows a two-dimensional photonic crystal for which the spatial distribution of the light emitted from a point-like defect is calculated.
Figure 8:
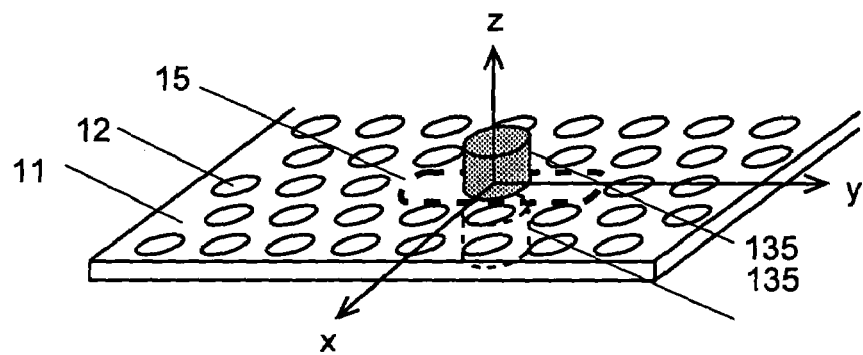
Figure 9:
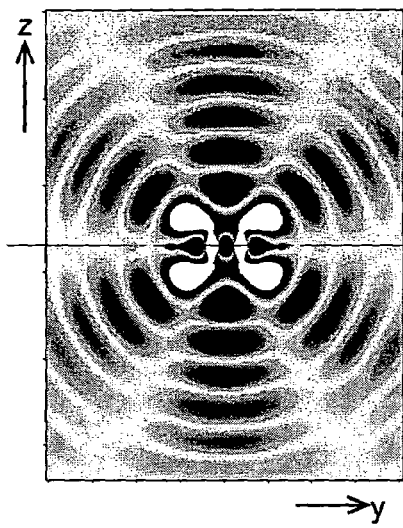
FIGS. 9(a) and 9(b) show the results of the calculation of the spatial distributions of the light emitted from a point-like defect.
Figure 9:
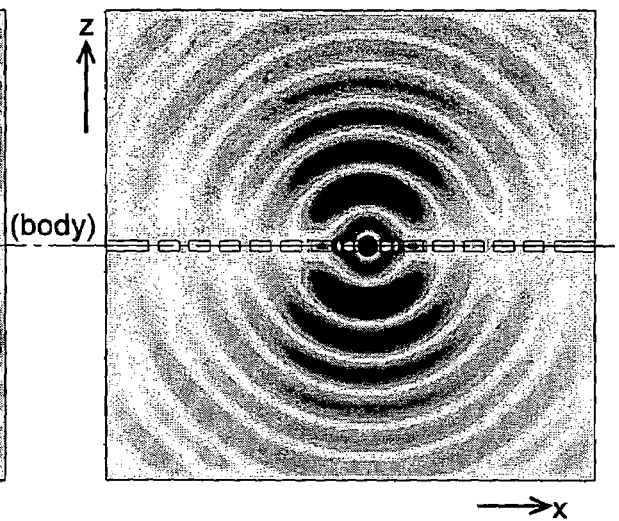
Figure 9:
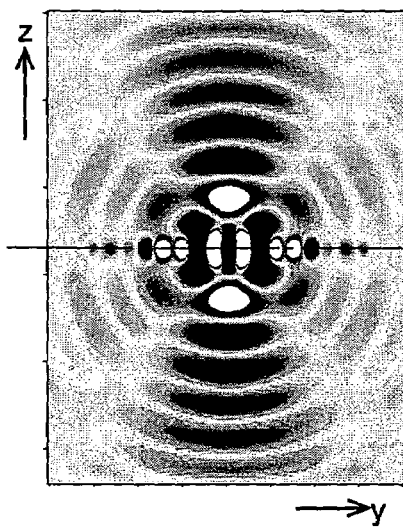
Figure 9:
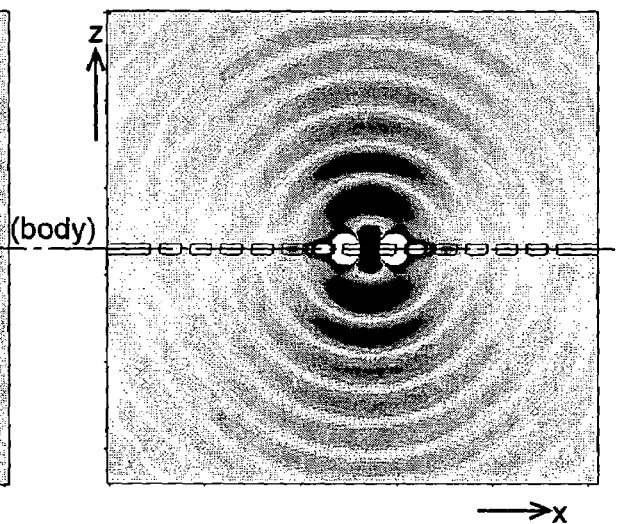

With respect to the two types of two-dimensional photonic crystal shown in FIGS. 8($a$) and 8($b$), the spatial distribution of light emitted from the point-like defect has been calculated. The point-like defect in FIG. 8($a$) is a donor type cluster defect consisting of three defects arranged in a line, and the one in FIG. 8($b$) includes the same donor type cluster defect with two identical pieces of refractive index members 135 symmetrically mounted on both sides. The refractive index member 135 shown in FIG. 8($b$) is a cylinder made of the same material as that of the body 11, which has a radius of 0.6a and a height of 0.6a, where a is the interval of the holes 12. The results of the calculation are shown in FIGS. 9($a$) and 9($b$). The left side pictures in FIGS. 9($a$) and 9($b$) show the emission intensity of light within the y-z plane shown in FIGS. 8($a$) and 8($b$). FIG. 9($a$) shows that the emission of light is strong not only in the direction perpendicular to the body (i.e. in z-direction) but also in a diagonal direction (at an angle of 60 degrees from z-axis). In contrast, FIG. 9($b$) shows that the diagonal emission is suppressed while the emission in z-direction is stronger than in FIG. 9($a$). The right side pictures in FIGS. 9($a$) and 9($b$) also show that the diagonal emission is more suppressed in FIG. 9($b$) than in FIG. 9($a$). These results suggest that the use of the refractive index members improves the efficiency of taking out light in the direction perpendicular to the body.

Methods of manufacturing the two-dimensional photonic crystal according to the present invention are described. Since the present specification does no explanation of the process of manufacturing the two-dimensional photonic crystal itself, the Japanese Unexamined Patent Publication No. 2001-272555 should be referred to for a detailed description about it. The following descriptions focus on two manufacturing methods of creating a refractive index member on the body.

Figure 10:
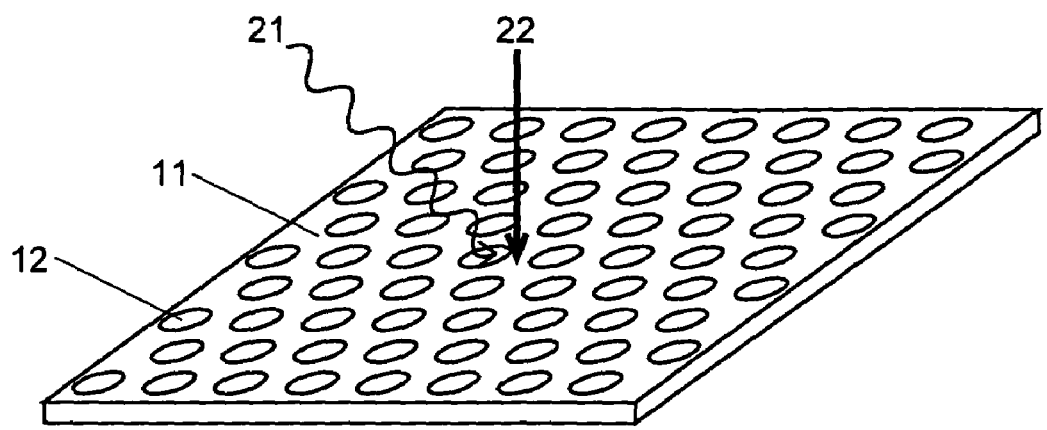
FIG. 10 is a perspective view showing the first method of manufacturing a two-dimensional photonic crystal slab having a three-dimensional local structure according to the present invention.

The first manufacturing method is described with reference to FIG. 10. While a gas 21 of a material used for creating the two-dimensional photonic crystal is continuously supplied onto the surface of the crystal, a focused ion beam 22 is irradiated onto a predetermined spot so that the material is ionized and deposited to form a refractive index member. A focused ion beam is a type of ion beam that can be converged and irradiated onto a minimal spot of a few nanometers in diameter. This enables the refractive index member to be locally deposited. In the present embodiment, the ions used in the focused ion beam are Ga (gallium) ions. An example of the gas material is phenanthrene ($C_{14}H_{10}$) in the case the material of the refractive index member is C (carbon).

Figure 11:
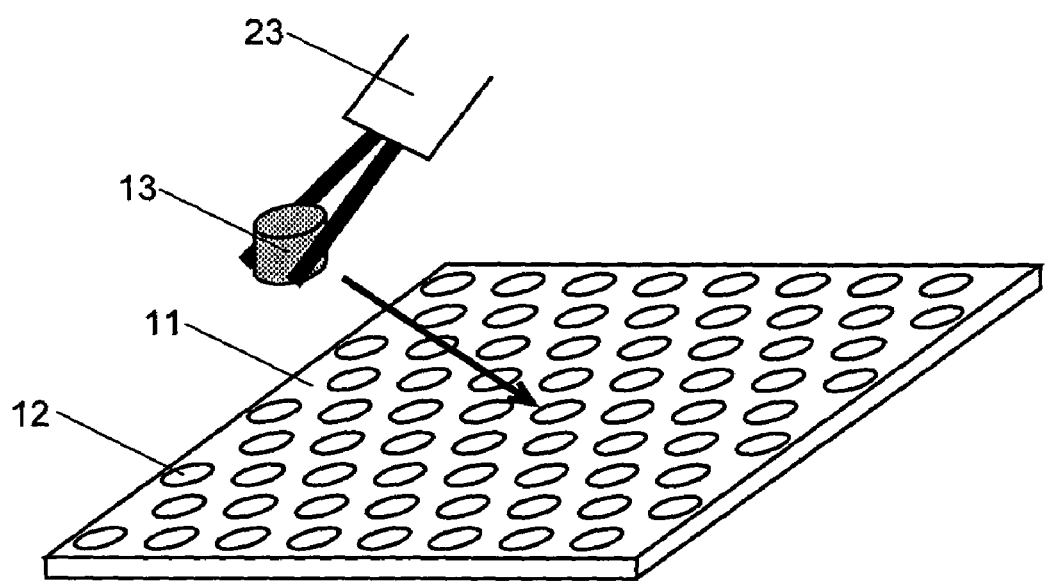
FIG. 11 is a perspective view showing the second method of manufacturing a two-dimensional photonic crystal slab having a three-dimensional local structure according to the present invention.

The second manufacturing method is described with reference to FIG. 11. In this method, a refractive index member 13 fabricated beforehand is mounted onto the two-dimensional photonic crystal with a nanomanipulator 23 capable of holding a member of a few nanometers in size. After the refractive index member is mounted, the photonic crystal and the refractive index member are bonded together by irradiating a laser beam to the boundary between them, or by other methods. This method allows the refractive index member 13 to be manufactured and worked outside the crystal, so that the refractive index member can be easily formed into a desired shape.

Figure 12:
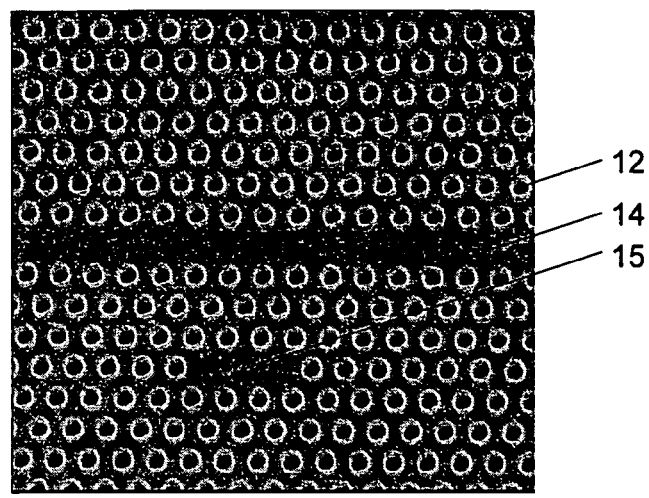
FIGS. 12(a)-12(c) show electron micrographs of a two-dimensional photonic crystal with a refractive index member formed on it.
Figure 12:
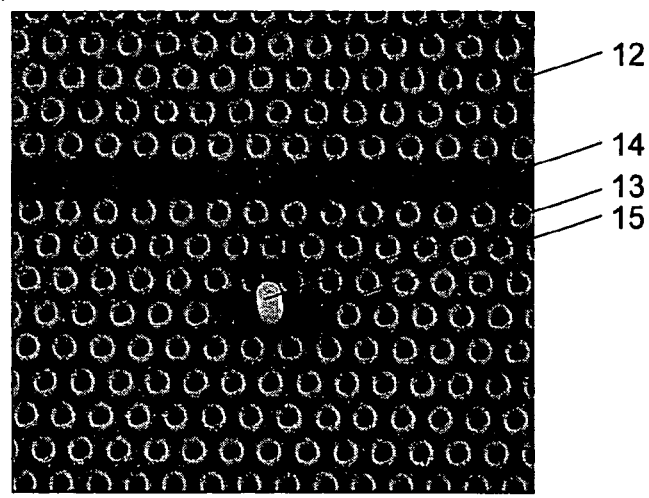
Figure 12:
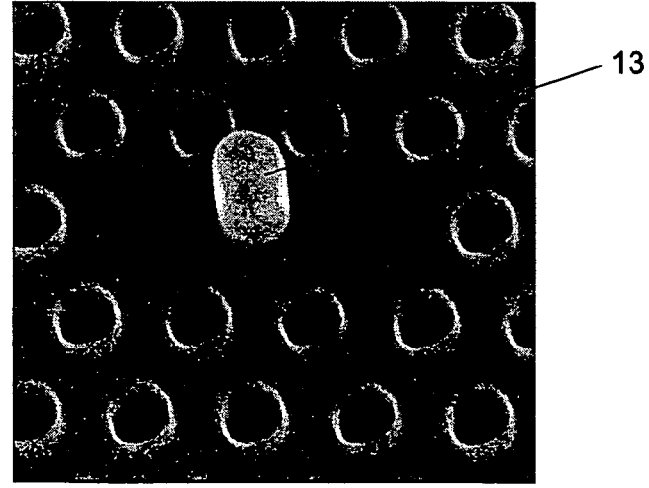

FIGS. 12(a)-12(c) show electron micrographs of a two-dimensional photonic crystal with a refractive index member formed on its surface. FIG. 12(a) shows a two-dimensional photonic crystal having a waveguide 14 and a linearly formed donor type cluster defect 15 before the refractive index member is formed. In FIG. 12(b), the crystal now has a refractive index member 13 made of carbon, created by the first manufacturing method. FIG. 12(c) provides an enlarged view of a part of the crystal shown in FIG. 12(b), including the refractive index member 13. These photographs show that the present manufacturing method has been successful in creating a refractive index member.

The invention claimed is:

1. A two-dimensional photonic crystal slab having a three-dimensional local structure, comprising:
   a) a slab-shaped body;
   b) a plurality of areas having a refractive index different from that of the body, which are periodically arranged in the body; and
   c) an optical resonator formed by mounting a refractive index member on the surface of the body.

2. The two-dimensional photonic crystal slab having a three-dimensional local structure according to claim 1, further comprising:
   a waveguide formed by providing a linear defect of the modified refractive index areas in proximity to the refractive index member.

3. The two-dimensional photonic crystal slab having a three-dimensional local structure according to claim 1, wherein two or more pieces of the refractive index members differing in material, shape or size are mounted on the body.

4. The two-dimensional photonic crystal slab having a three-dimensional local structure according to claim 1, wherein a point-like defect of the modified refractive index areas are provided within the body and a refractive index member is additionally mounted at the position of the point-like defect.

5. The two-dimensional photonic crystal slab having a three-dimensional local structure according to claim 4, wherein a plurality of point-like defects of the modified refractive index areas having different resonant wavelengths are provided within the body, and a plurality of the refractive index members identical in material, shape and size are arranged on a surface of the body at positions of the point-like defects.

6. The two-dimensional photonic crystal slab having a three-dimensional local structure according to claim 1, wherein the refractive index members are mounted on both sides of the body.

7. The two-dimensional photonic crystal slab having a three-dimensional local structure according to claim 6, wherein the refractive index members are mounted at the same position on both sides of the body.

8. The two-dimensional photonic crystal slab having a three-dimensional local structure according to claim 7, wherein identical refractive index members are mounted at the same position on both sides of the body.

9. The two-dimensional photonic crystal slab having a three-dimensional local structure according to claim 1, wherein it is provided with a point-like defect of the modified index areas asymmetrical between front and back sides.

10. The two-dimensional photonic crystal slab having a three-dimensional local structure according to claim 1, wherein the refractive index member is made of the same material as that of the body.

11. The two-dimensional photonic crystal slab having a three-dimensional local structure according to claim 1, wherein the refractive index member is made of a material whose refractive index changes when the material receives an external operation.

12. A two-dimensional photonic crystal slab having a three-dimensional local structure, comprising:
   a) a slab-shaped body:
   b) a plurality of areas having a refractive index different from that of the body, which are periodically arranged in the body; and
   c) a refractive index member mounted on the surface of the body, wherein the refractive index member is a cylinder whose top is concave or convex.

13. A method of manufacturing the two-dimensional photonic crystal slab having a three-dimensional local structure of claim 1, the method comprising:
   a process for creating a refractive index member in which a gas material used for creating a refractive index member is introduced onto a two-dimensional photonic crystal and a focused ion beam is irradiated onto the crystal to deposit the refractive index member.

14. A method of manufacturing the two-dimensional photonic crystal slab having a three-dimensional local structure of claim 1, the method comprising:
   a process for creating a refractive index member in which a refractive index member beforehand is mounted onto the two-dimensional photonic crystal with a nanomanipulator.

15. A two-dimensional photonic crystal slab having a three-dimensional local structure wherein the slab functions as an optical multiplexer/demultiplexer and the slab comprises:
   a) a slab-shaped body;
   b) a plurality of areas having a refractive index different from that of the body, which are periodically arranged in the body;
   c) an optical resonator formed by mounting a refractive index member on the surface of the body; and
   d) a waveguide formed by providing linearly arranged defects of the modified refractive index areas in proximity to the refractive index member.

* * * * *